United States Patent [19]

Davis

[11] 4,128,938
[45] Dec. 12, 1978

[54] NUT-CRACKING IMPLEMENT

[76] Inventor: William E. Davis, 762 Lindo La., Port St. Lucie, Fla. 33452

[21] Appl. No.: 818,569

[22] Filed: Jul. 25, 1977

[51] Int. Cl.² .......................................... A47J 43/26
[52] U.S. Cl. .................................... 30/120.3; 99/572
[58] Field of Search ............... 99/572, 582; 30/120.1, 30/120.2, 120.3, 120.4, 120.5

[56] References Cited

U.S. PATENT DOCUMENTS

| 699,529 | 5/1902 | Hutchinson | 99/582 |
| 930,796 | 8/1909 | Quackenbush | 30/120.4 |
| 1,113,990 | 10/1914 | Henderson | 30/120.4 |
| 1,219,859 | 3/1917 | Paxton | 30/120.3 |
| 1,268,484 | 6/1918 | Olasz | 30/120.4 |
| 1,860,746 | 5/1932 | MacDougall | 99/582 |
| 2,004,858 | 6/1935 | Farabough | 30/120.3 UX |
| 2,099,978 | 11/1937 | Hess | 30/120.3 UX |
| 2,426,120 | 8/1947 | Posey | 30/120.4 |
| 2,804,111 | 8/1957 | Burchett | 30/120.3 |
| 3,049,160 | 8/1962 | Smith | 99/572 |
| 3,105,532 | 10/1963 | Weems | 99/572 |
| 3,589,420 | 6/1971 | Davis | 99/572 |
| 3,841,212 | 10/1974 | Powell | 30/120.2 X |
| 4,044,663 | 8/1977 | Straw | 99/582 |

Primary Examiner—Harold D. Whitehead
Attorney, Agent, or Firm—Dew & Dew

[57] ABSTRACT

A powerful lever is swiveled at one end to a vertical column supported on a base or container. An anvil adjustably mounted upon the column, forms an abutment cooperating with the lever for cracking of nuts. An enclosure is mounted upon the lever for adjustment therealong to a position enclosing the nut while being cracked, and directs shell fragments downwardly into a receptacle for convenient disposal.

10 Claims, 5 Drawing Figures

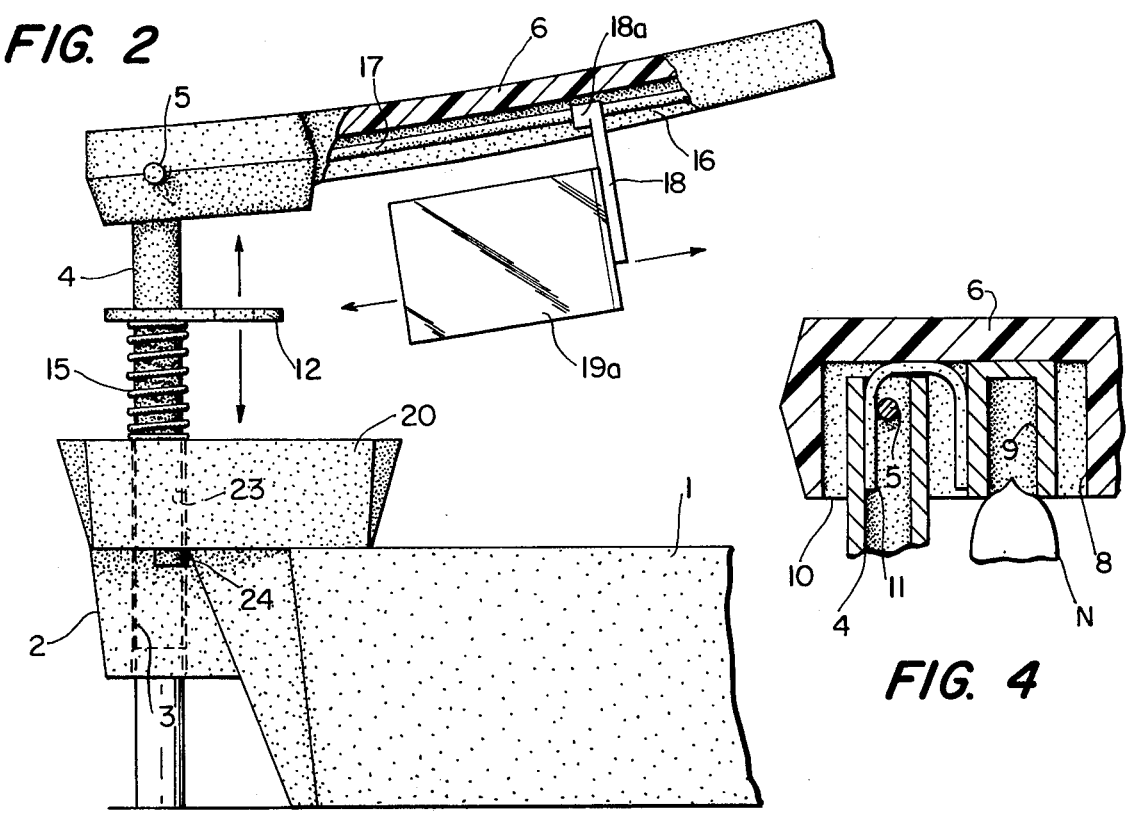
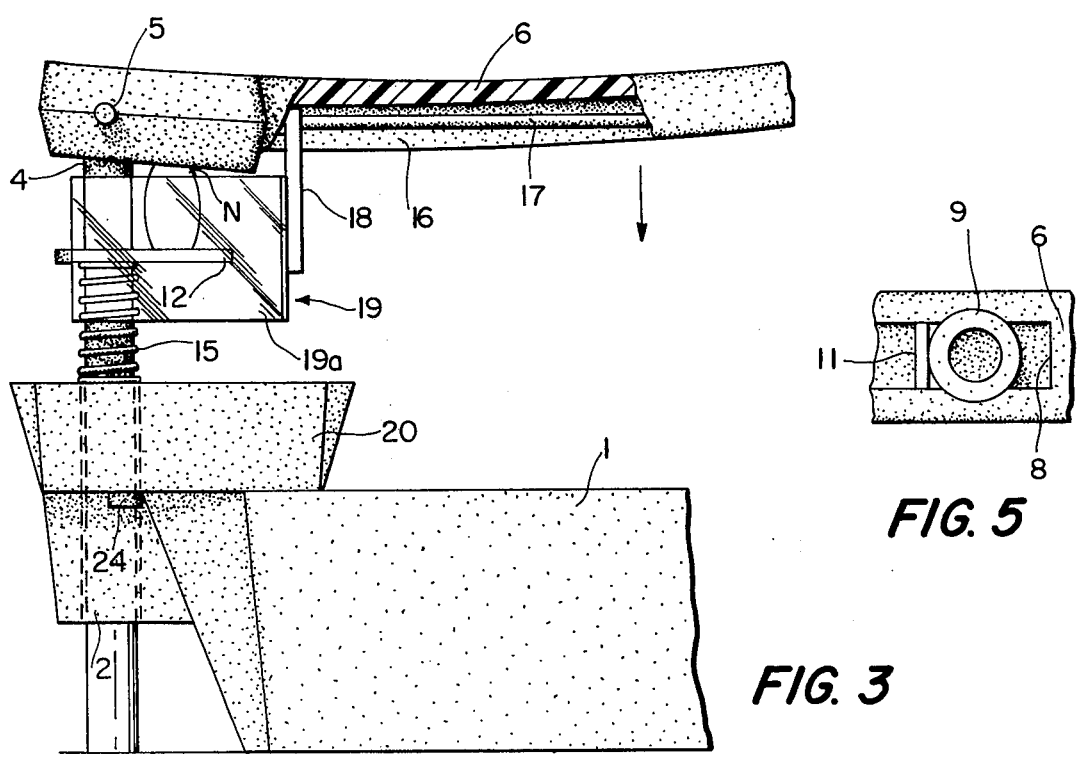
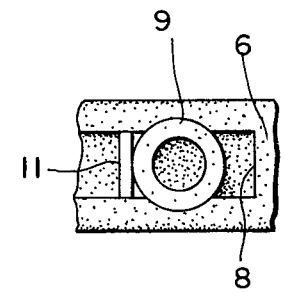

NUT-CRACKING IMPLEMENT

BACKGROUND OF THE INVENTION

The present interest in natural or health foods is the result of a growing public conviction that pure food laws are inadequate or are too laxly enforced to prevent the deleterious adulteration or contamination of packaged foods. In numerous instances, preservatives, colorings, flavorings and various other additives are used by food processors, whose effect upon the health of consumers is suspected, unknown or untested.

This trend to the use of natural or health foods has greatly increased public awareness of the fact that the meats of freshly-cracked nuts form almost perfect nutriments. Nature itself provides the meats with a nearly-perfect, sanitary, air-tight shell enclosure, while the meats themselves are rich in vitamins essential to health, as well as having excellent nutritional content.

Thus the consumption of nuts such as pecans, English walnuts, filberts, almonds, Brazil nuts, butternuts, hickory nuts and many other kinds, is rapidly increasing. While it is possible to purchase packaged nut meats, such products are open to the same objections as other packaged foods, namely, possible lack of sanitation in packaging, contaminants and objectionable preservatives. Hence there is an increasing and desirable tendency to crack nuts and extract the meats for immediate consumption, alone or as ingredients in foods being prepared for the table.

One disadvantage of this tendency is that the cracking of nuts in the home can be a messy procedure. The shells of most nuts, being hard and brittle, tend to fracture into pieces of various sizes, which can fly about in random manner. Thus, when nuts are cracked as by laying each on a firm base or anvil and striking it with a hammer, or when a conventional or prior art cracking implement is used, it usually results in the necessity for a subsequent clean-up job such as sweeping the floor and brushing off other horizontal surfaces such as chairs.

Reference is made to my U.S. Pat. No. 3,589,420, granted June 29, 1971, and showing a nut-cracking implement of which the present invention is a modified and improved version.

SUMMARY OF THE INVENTION

It is the chief purpose and object of my invention to provide an implement or utensil which largely solves the foregoing problems, by providing a nut-cracking implement which is powerful, convenient to use and which, most importantly, encases each nut while it is being cracked and prevents fragments of its shell from flying about in a random way.

Another object is to provide an implement as aforesaid, which is quickly adjustable to the particular size of each nut being cracked.

A still further object is to afford an implement in which the cracked nuts are collected and retained for immediate extraction and use of their meats.

Other objects and advantages will become clear to those skilled in the art, after a study of the following detailed description, in connection with the accompanying drawing.

BRIEF DESCRIPTION OF THE DRAWING

FIG. 2 is a detail side view, partly in section, showing the rearward portion of the container, the pillar, anvil and lever;

FIG. 3 is a view like FIG. 2, showing a nut about to be cracked between the lever and anvil, and with the enclosing capsule in operating position;

FIG. 4 is a detail section to an enlarged scale, of the proximal end of the lever and its pivotal mounting; and FIG. 5 is a detail view, looking up, showing the cracking head mounting in the lever, and one end of the lever-biasing leaf spring.

DETAILED DESCRIPTION OF THE PREFERRED EMBODIMENT

Figure 1:
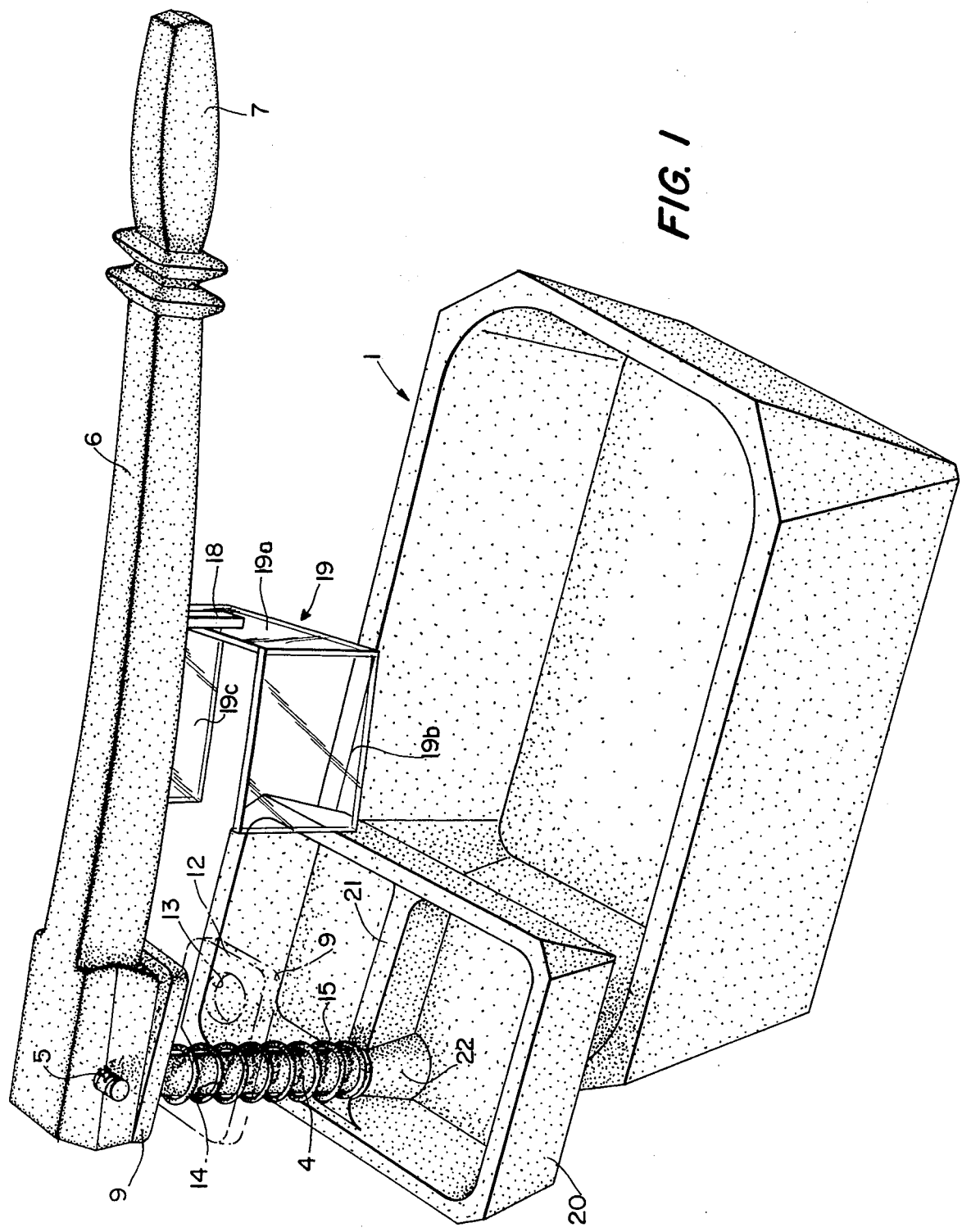
FIG. 1 is a perspective view of an assembled implement ready for use and with its enclosure or capsule retracted.

A container, receptacle or base 1 may be of wood, plastic or metal, stamped or otherwise formed, and which as shown, is generally rectangular with chamfered ornamental corners, and size and depth sufficient to contain, for example, two to three quarts of nuts in the shell. At the central upper portion of its rear edge the container has a rearwardly-directed projection or protrusion 2 preferably formed integrally therewith. The upper surface of the projection is shown as flush with the top edge of the container and has therein a central vertical bore 3 sized to receive with a smooth fit, a tubular pillar or column 4. The bore stops short of the lower surface of the projection and forms an abutment so that when in place, the column is pivotally mounted with its top end a fixed distance above the level of the plane of the container's top edge.

At its upper end column 4 is diametrically pierced to receive with a smooth fit, a normally-horizontal pivot pin or bolt 5 which also passes at its ends through a transverse bore in a lever 6 and, as indicated upon FIGS. 2 and 3, is conveniently molded from hard plastic. An ornamental handle 7, FIG. 1, is formed integrally with the lever at its distal end. Pin 5 may be threaded at both ends to receive ornamental acorn nuts, not shown.

Referring more particularly to FIG. 4, the proximal end of lever 6 is formed with a downwardly-facing cavity 8 into which the top end of column 4 extends. A metal abutment 9 is rigidly fixed within the cavity, a short distance forwardly or outwardly of pivot 5. The abutment or crushing head is shown as tubular so that it receives the generally spherical surface of a nut N and prevents it from slipping when cracking force is applied. A convenient way of securing the head or abutment to the lever, is indicated upon FIG. 5 where it is shown as of somewhat greater diameter than the transverse dimension of cavity 8. It may thus have a press fit within the cavity and with or without adhesive, be securely and rigidly fixed to the lever. Other shapes, forms and manner of securement within cavity 8, are possible and contemplated.

As will be clear from inspection of FIG. 4, upward pivoting of lever 6 on and about pivot 5 is limited by engagement of its edge at 10, with column 4. A leaf spring 11 of inverted "U" form, is located within cavity 8. The spring straddles one end edge of column 4 with one leg passing downwardly therein between the column and pivot 5. The other end extends downwardly outside of and forwardly of the column and bears against head or abutment 9. In this way lever 6 is continuously urged counterclockwise as viewed upon FIG. 4, to the limiting position wherein edge 10 bears against the column. In this position the longitudinal axis of lever 6 will be a few degrees, say 5° to 10° above horizontal.

A generally rectangular plate or anvil 12 of heavy gage metal is pierced with holes 13, 14, FIG. 1. The parallel axes of the holes are spaced the same as the distance between the central axis of column 4 and head 9. Hole 14 is slightly greater in diameter than that of the column so that any force acting downwardly upon the plate, offset from the axis of the column, causes it to grip the column in any vertical position of adjustment therealong it may have at that time. Thus as in my prior patent previously identified, with the anvil properly adjusted vertically on and along the column, a nut seated in hole 13 may be readily cracked when a downward force on handle 7 causes abutment or head 9 to press down upon the top of the nut. It has been found that the tubular form of the head is very effective in causing the shell of a nut to bulge outwardly and fracture in a uniform way which promotes easy extraction of its meats and produces a minimum of shell fragments.

A relatively light coil spring 15 loosely encircles column 4 and has a length so correlated with the exposed portion thereof, as to continuously urge anvil 12 into its upper limiting position as shown at FIG. 1 wherein it contacts the proximal end of lever 6. Thus the invention is readily adapted to the cracking of nuts of different sizes, shapes and diameters, merely by pressing anvil 12 downwardly from its upward limiting position, until the nut rests on the rim of hole 13, allowing spring 15 to elevate anvil 9 until the nut also rests in head 9 when lever 6 is elevated to its maximum position by spring 11. Then force exerted upon handle 7 causes the anvil to lock to the column and upon continued exertion of force, to crack the nut. The positioning as aforesaid is readily effected with the left hand only, while handle 7 remains grasped by the right hand. Rapid and efficient cracking of nuts is thereby effected.

FIGS. 2 and 3 show that lever 6 has therein a downwardly-facing longitudinal channel or groove 16 which may extend from a location near cavity 8 to and within handle 7. The precise length of the channel is not critical. A rod 17, preferably of metal, has its ends secured to and within holes in the handle, to extend centrally in and along the channel. A slide 18 has its upper end formed as a sleeve 18a encircling and freely adjustable along the rod. The depending end of the slide extends below the lever and carries there a box-like enclosure 19 which may be of transparent sheet plastic.

Reference to FIG. 1 shows that in addition to end wall 19a secured centrally to the downward end of slide 18, the enclosure comprises left and right side walls 19b, 19c each having its rearward vertical edge fixed to or integral with the respective vertical edges of end wall 19a. The transverse dimension of slide 18 may conveniently be a little less than the corresponding dimension of channel 16 so that the slide is limited essentially to translation on and along rod 17. Likewise the dimensions of enclosure 19 are such that when it is adjusted from, say, the position shown upon FIGS. 1 and 2, to that of FIG. 3, it effectively surrounds a nut N being cracked and thus prevents fragments of its shell from flying about the room. Since in this position the otherwise open top and forward end of enclosure 19 are at least partially obturated by the wide proximal end of lever 6 and column 4, respectively, practically all shell fragments are directed or diverted downwardly through the open bottom of the enclosure.

From FIG. 1 it is noted that the invention comprehends a second container or pan 20, in addition to item 1. This second pan is of much smaller capacity than item 1 but may be of the same material and general appearance. It has a central vertical partition 21 integral with its bottom and side walls. The partition is thickened at or near one end as indicated at 22 to provide for a vertical bore 23 sized for a smooth reception of column 4. Thus as shown, FIGS. 1, 2 and 3, the apparatus may be assembled by first passing the column through the bore in pan 20, then into bore 3 in container 1, until the lower end of the column contacts the closed end of bore 3. In this way pan 20 is firmly mounted upon the container in the manner depicted upon FIG. 1. The pan may have laterally-spaced lugs integrally depending from the bottom thereof. One such lug is identified at 24, FIGS. 2 and 3, and the other, not shown, is symmetrically located at the other side of the column. These lugs are so located that when pan 20 rests down upon container 1, they contact the rear edge of the latter and thus act to prevent turning between items 1 and 20 about the axis of the column.

The use and operation of the invention will be clear from the foregoing description. With the implement assembled and adjusted as shown in FIG. 2, a nut is positioned to seat in hole 13 of anvil 12. Spring 15 urges the anvil upwardly and holds the nut with its top end seated in abutment 9, as indicated upon FIG. 4. Slide 18 and enclosure 19 are then moved forwardly along lever 6 until they are in the position of FIG. 3 and thus enclose the nut. Then downward force applied to handle 7 acts through the nut to apply an offset force to the anvil which then locks to the column. Further force on the handle cracks the nut, and shell fragments are intercepted by the enclosure and directed downwardly into pan 20. Container 1 is useful to hold an ample supply of uncracked nuts. Alternatively of course it may be used to hold nuts after they have been cracked.

When not in use the implement may be disassenbled simply by raising column 4 from registering holes in pan 20 and container 1 whereupon these parts are free and separate for cleaning, storage and subsequent use. When desired pan 20 may be omitted without affecting operation of the remaining parts of the implement, as described.

Numerous changes of shapes, sizes, relative dimensions, the substitution of equivalents and modifications, will become obvious to those skilled in the art, after a study of the foregoing description.

I claim:

1. A nut-cracking implement comprising, a base, a column journaled at its lower end to said base and rising vertically therefrom, a lever pivoted at its proximal end to the top end of said column, for pivoting about a normally-horizontal axis, an anvil adjustable on and along said column and fixable thereto at any selected position therealong, nut-abutment means fixed with said lever in offset relation with respect to said horizontal axis, a hollow box-like enclosure, of generally parallelepipedal form, and first means mounting said enclosure to said lever for translation therealong, from a first retracted position to a second position enclosing said anvil.

2. The implement of claim 1, said anvil having a hole loosely surrounding said column for locking thereto by and in response to force thereon offset from said column, and a spring loosely surrounding said column between said base and anvil and urging the latter upwardly toward said lever.

3. The implement of claim 1, said base comprising a first container having a bottom and side and end walls extending upwardly from its respective edges, one said wall having a protrusion extending fixedly therefrom, there being a normally-vertical hole in said protrusion and in which the lower end of said column is journaled for rotation.

4. The implement of claim 1, the proximal end of said lever being formed with a downwardly-facing cavity into which the upper end of said column projects, a pin extending horizontally through registering holes in said column and side walls of said cavity, to define said horizontal axis, and spring means in said cavity acting to urge the distal end of said lever upwardly.

5. The implement of claim 4, a nut-cracking head fixed in said cavity offset from said pin, said spring means comprising a leaf spring of inverted "U" shape, with one leg depending into said column between the wall thereof and said pin, the other leg of said spring contacting said head.

6. The implement of claim 5, said head being tubular with open downwardly-facing end.

7. The implement of claim 1, there being a downwardly-facing channel in and extending horizontally along the lower surface of the lever, said first means comprising a rod fixed at its ends in and to the ends of said channel, a slide mounted on said rod for translation therealong, and an arm depending from said lever, from said slide, and attached at its lower end to said enclosure.

8. The implement of claim 7, said enclosure comprising a planar end wall generally normal to the longitudinal axis of said lever, and right and left side walls secured to the respective vertical edges of said end wall and extending forwardly therefrom, to enclose said anvil when said enclosure is in its said second position.

9. The implement of claim 3, a pan having a bottom and side walls upstanding therefrom and of smaller volume than said container, there being a second hole extending vertically through said pan for a smooth fit on and about said column, above said container, to thereby mount said pan in superposed contacting relation with said container, on and supported by the top edges of the side walls of said container.

10. The implement of claim 9, said pan including a vertical partition extending between and spaced from the side walls thereof, said second hole being in and extending through said partition.

* * * * *